Dec. 29, 1964  N. N. ESTES ETAL  3,163,806
STRUCTURALLY IMPROVED ELECTRICAL READOUT INTEGRATOR
Filed Jan. 19, 1961
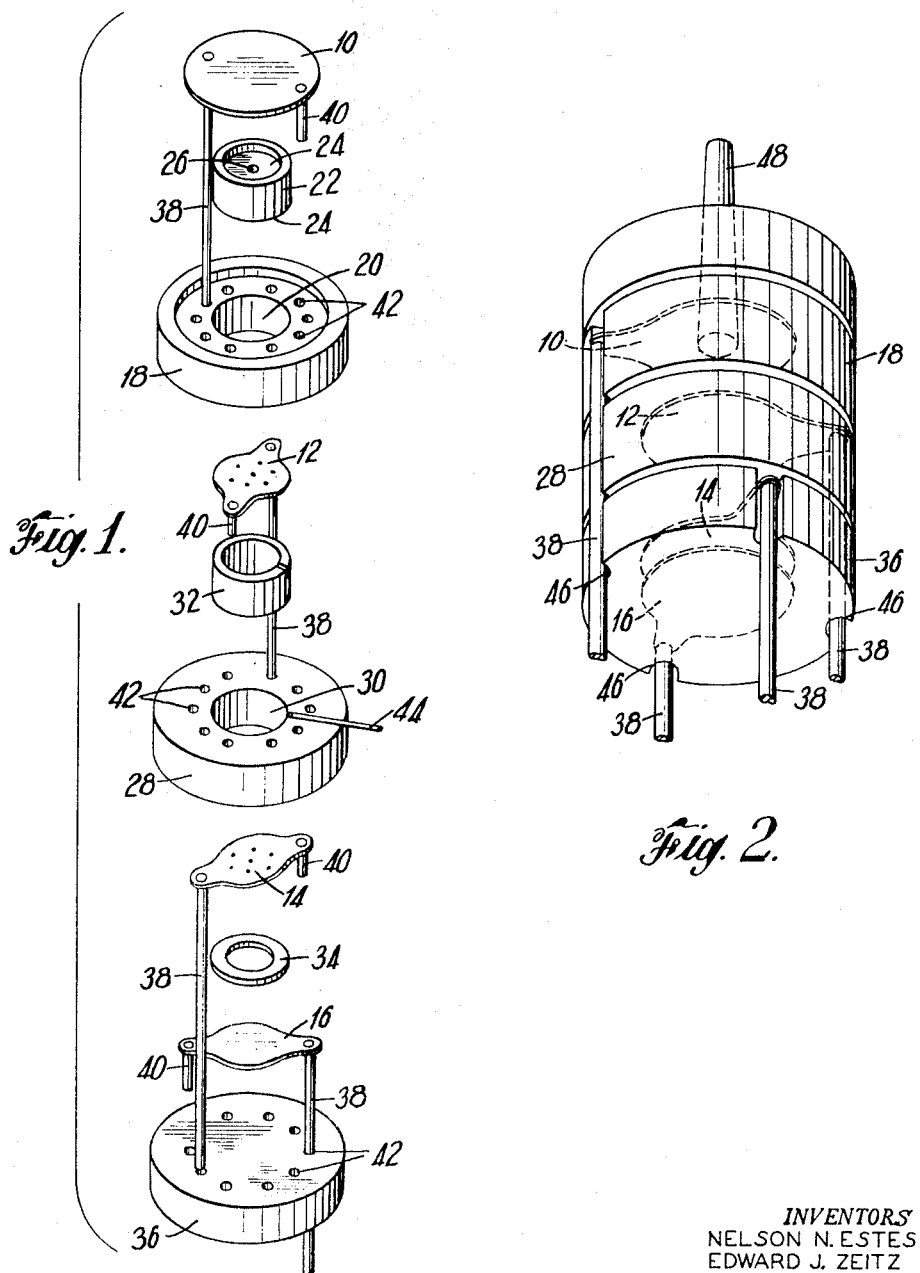
INVENTORS
NELSON N. ESTES
EDWARD J. ZEITZ
WILLIAM E. MORLEY
BY Robert C. Cummings
ATTORNEY

United States Patent Office 3,163,806
Patented Dec. 29, 1964

3,163,806
STRUCTURALLY IMPROVED ELECTRICAL
READOUT INTEGRATOR
Nelson N. Estes, Austin, Tex., and Edward J. Zeitz, Parma Heights, and William E. Morley, Bay Village, Ohio, assignors to Union Carbide Corporation, a corporation of New York
Filed Jan. 19, 1961, Ser. No. 83,680
6 Claims. (Cl. 317—231)

This invention relates to an improved mechanical construction for an electrical readout integrator and a method of assembling the same.

A family of electrochemical devices in which a number of different effects are achieved by the movement of ions in solution has recently attracted favorable attention. These devices have come to be known as "solions." They are discussed in some detail in the literature; Journal of the Electrochemical Society, vol. 104, 12 (December 1957); Yale Scientific Magazine, vol. XXXII, No. 5 (February 1958), and Electronics Products Engineering Bulletin No. 1, published November 1957, by National Carbon Company, 270 Park Avenue, New York 17, New York.

One solion device which has been developed is called an "integrator." It has the ability by measuring the transfer of ions, to indicate the integral of a current applied to it over a period of time. One type of integrator is provided with electrodes so that its signal can be read electrically. It is termed an electrical readout integrator. It is this type with which the present invention is concerned.

An electrical readout integrator is a solion consisting of a cell containing as electrolyte a solution of a reversible redox system, the solution being divided into three zones of different concentrations of a measured species of such system, all zones being electrically connected through the electrolyte. One of the three zones, called the "integral" zone is of variable concentration. Another zone high in concentration of the measured species, is called the "reservoir" zone. Between the integral zone and the reservoir zone is a zone low in concentration of measured species. Unfortunately, in this type solion, there is a tendency for diffusion of species to occur from one zone to the other due to the differences in concentration therein. Such diffusion is detrimental for it affects the accuracy of the integration.

Co-pending, U.S. application, Serial No. 777,009, now Patent No. 3,021,482, filed by N. N. Estes, one of the applicants in this application, discloses and claims an improved electrical readout integrator in which the tendency for diffusion of species from one zone to another is minimized. Estes' integrator, in addition to properly biased electrodes in different zones of concentration, has a barrier in the form of a capillary which minimizes diffusion effects between concentration zones.

More specifically, the electrical readout integrator disclosed by Estes comprises a vessel having two compartments which are connected by a capillary. Electrical connection between the two compartments is maintained by an electrolyte. One compartment contains an input electrode and the concentration of measured species therein is high. In the other compartment, an electrode common to the input to the integrator and the readout therefrom, a readout electrode, and a shield electrode which tends to prevent undesired passage of species, are located. Between the common electrode and the readout electrode there is the zone of variable concentration which is referred to as the integral zone. Between the readout electrode and the shield electrode, the concentration of measured species is dilute. To complete the integrator suitable leads are applied to the various electrodes.

In operation, the current to be integrated is applied to the integrator through the input electrode and the common electrode. This will cause an increase in concentration in the integral zone. This zone is usually very small and for reproducibility must be precisely controlled.

The method of manufacturing the integrators described in the application referred to above, comprises assembling the parts in glass tubing. The electrodes are firmly sealed to the walls of the tubing and the capillary is formed in place between the shield electrode and the input electrode by heating and drawing the tube at that point to form the capillary which connects the two compartments. Unfortunately, such an operation is difficult to perform so that the proper spacing and distances are obtained without distorting some other feature of the integrator.

In addition, the normal relatively small integral zone between the common electrode and the readout electrode is difficult to maintain while the two electrodes are sealed into the glass body of the device. These electrodes must be spaced in very close proximity, suitably about 0.004 inch. An attempt to avoid this difficulty has been made by employing a separator of diamond dust. The separator consists of six diamond dust particles of about .006 inch diameter which do not contain any fissures which would crack under pressure. The particles are pressed into the readout electrode in a concentric design by use of a suitable jig.

An alternate separator which is also used is provided by sprinkling properly sized particles of aluminum oxide onto the readout electrode to perform a similar function. Unfortunately, such procedures are not conducive to automated production on a large scale.

Accordingly, the principal object of the invention is to provide an improved construction for an electrical readout integrator which obviates the above discussed difficulties.

A second object of the invention is the use of components for an electrical readout integrator which permit the device to be built up in a systematic manner which is adaptable to production so that a reproducible product is possible.

The objects of the invention are accomplished by the use of precise blocks of Multiform glass and ceramic inserts as the elements which house, separate and position the various electrodes of an electrical readout integrator; the Multiform blocks being fused together to form a one piece device. Multiform glass is a proprietary product of the Corning Glass Works, Corning, New York. Multiform is glass made from small uniform particles pressed to shape in a tool or form. This initial pressing is fired at high temperatures to consolidate the tiny glass particles by fusion into a non-porous, vacuum-tight structure in which all of the properties of the parent glass are essentially retained. The preferred formulation for use in the practice of the invention is a high silica, lime glass of high purity which has no heavy metals and which possesses the proper co-efficiency of expansion so that it may be heat sealed around the metal parts of the integrator. Alternatively, precise plastic blocks, suitably of Teflon, may be employed in place of the precise blocks of Multiform glass. In this event the inserts or spacers would be made of aluminum oxide.

The invention will be more readily understood by reference to the drawing, wherein:

FIG. 1 is an exploded view of one embodiment of the electrical readout integrator of the present invention; and FIG. 2 is an elevational view of another embodiment of the integrator of the invention.

Referring now to the drawing and particularly to FIG. 1, the integrator of the invention comprises a combination diaphragm and input electrode 10, suitably of platinum, a shield electrode 12 and a readout electrode 14, both suitably of perforated platinum foil, and a common electrode 16, suitably of platinum. Alternatively, the electrodes may be fabricated from tantalum carbide or niobium carbide. Between the input electrode 10 and the shield electrode 12 is a Multiform glass block 18 which is provided with a central aperture 20. A ceramic insert 22, suitably of magnesium silicate is located within the central aperture 20. The ceramic insert 22 is provided with depressions 24 on both its top and bottom which serve as electrolyte reservoirs and a capillary 26 is provided through the insert 22, which connects the electrolyte reservoirs. Between the shield electrode 12 and the readout electrode 14 is a second Multiform glass block 28 which is also provided with a central aperture 30. A second ceramic insert 32 is provided within aperture 30 to insure that proper cross-section is maintained after the blocks are fused together at high heats. If very careful temperature control is to be maintained during the fusion process, ceramic insert 32 may be omitted. In fact under such conditions ceramic insert 22 may also be omitted and instead Multiform glass block 18 could be molded or formed with a capillary and electrolyte reservoirs. Again referring to FIG. 1, the closely proximate readout electrode 14 and the common electrode 16 are separated by a very thin ceramic washer 34. In practice, the characteristics of a particular integrator may be controlled by controlling the space between the readout electrode 14 and the common electrode 16. In order to accomplish this, the thickness of the ceramic washer 34 may be varied from as small as about 0.0004 inch to as much as about 0.008 or even 0.010 inch. The bottom member of the integrator of the invention is a Multiform glass block 36. Each of the electrodes 10, 12, 14 and 16 are provided with two leads, one of which is of sufficient length to extend completely through and out the base of the integrator and there serve as the terminal 38 of the particular electrode, and the other is relatively short and serves as a location stud 40 with respect to the adjacent Multiform glass block. The leads 38 and 40 pass through two of the plurality of small apertures 42 which are provided in the periphery of the Multiform glass blocks 18, 28 and 36.

The integrator illustrated in FIG. 1, is filled with electrolyte after the Multiform glass blocks 18, 28 and 36 are fused together and the leads 38 and 40 are fused to the glass, through side filler tube 44.

In the modified integrator of FIG. 2, in place of threading the electrode terminals 38 through apertures 42, the terminals are fitted into outwardly facing grooves 46 which are provided in the periphery of the Multiform blocks 18, 28 and 36, at the time they are formed. This alternative construction permits the omission of location studs 40. In addition, FIG. 2 shows an alternative filler tube 48 which may be provided in combination with the input electrode 10, instead of the side filler tube 44 (illustrated in FIG. 1). Either filler tube 44 or 48 is acceptable in either illustrated embodiments of the invention.

In this embodiment, the exposed terminals 38 may be suitably protected by potting or encapsulating the entire electrical readout integrator in plastic.

We claim:

1. In an electrical readout integrator of the type which comprises two compartments separated by a capillary, but electrically connected by an electrolyte in said compartments and said capillary which comprises a reversible redox system, and in which one of said compartments contains an input electrode and the other of said compartments contains a shield electrode, a readout electrode, and a common electrode, said readout electrode and said common electrode being positioned in close proximity; the improved construction characterized in that inert heat fusible blocks chosen from the group consisting of Multiform glass and plastics are located between said input electrode and said shield electrode, between said shield electrode and said readout electrode respectively and adjacent the under surface of said common electrode; said block located between said input electrode and said shield electrode being provided with two electrolyte reservoirs connected by a capillary; said block located between said shield electrode and said readout electrode also being provided with a central aperture therein; said closely proximate readout electrode and common electrode being physically separated by a thin washer chosen from the group consisting of ceramics and aluminum oxide; said input, shield, readout, and common electrode each being provided with at least one wire lead which passes through means provided in said blocks and out of said electrical readout integrator to serve as terminals thereof; said leads being fused to said blocks which are also fused to one another thereby serving as a one member exterior body for said components of said electrical readout integrator.

2. In an electrical readout integrator of the type which comprises two compartments separated by a capillary, but electrically connected by an electrolyte in said compartments and said capillary which comprises a reversible redox system, and in which one of said compartments contains an input electrode and the other of said compartments contains a shield electrode, a readout electrode, and a common electrode, said readout electrode and said common electrode being positioned in close proximity; the improved construction characterized in that Multiform glass blocks are located between said input electrode and said shield electrode, between said shield electrode and said readout electrode respectively, and adjacent the under surface of said common electrode; said glass block located between said input electrode and said shield electrode being provided with a central aperture therein wherein a ceramic insert is provided with depressions on its top and bottom which serve as electrolyte reservoirs and which are connected by a capillary through said insert; said glass block located between said shield electrode and said readout electrode also being provided with a central aperture therein wherein a ceramic liner is provided; said closely proximate readout electrode and common electrode being physically separated by a thin ceramic washer; said input, shield, readout and common electrodes each being provided with at least one wire lead which passes through means provided in said glass blocks and out of said electrical readout integrator to serve as terminals thereof; said leads being fused to said glass blocks which are also fused to one another thereby serving as a one member exterior body for said components of said electrical readout integrator.

3. The electrical readout integrator of claim 2 wherein said ceramic washer which is located between said readout electrode and said common electrode has a thickness in the range of from about 0.0004 inch to about 0.010 inch.

4. The electrical readout integrator of claim 3 wherein said glass blocks are provided with a plurality of apertures about their periphery and said input, shield, readout and common electrodes are each provided with two wire leads which are threaded into said apertures, one each of said two leads being relatively long and extending out of said integrator to serve as terminals thereof, and the other lead of each two leads being relatively short and extending down into the adjacent glass block to serve as a positioning stud.

5. The electrical readout integrator of claim 3 wherein said glass blocks are provided with at least one outwardly facing groove in its periphery and said input, shield, readout and common electrode are each provided with a terminal lead which fits into said outwardly facing grooves and which extend out of said integrator to serve as terminals thereof.

6. The electrical readout integrator of claim 5 wherein a covering of plastic is provided around the assembly of said glass blocks.

References Cited in the file of this patent
UNITED STATES PATENTS

| | | |
|---|---|---|
| 2,685,025 | Root | July 25, 1954 |
| 2,896,095 | Reed | July 21, 1959 |
| 2,913,632 | Stanton | Nov. 17, 1959 |